United States Patent
Schmeiser et al.

(10) Patent No.: US 11,027,868 B2
(45) Date of Patent: Jun. 8, 2021

(54) METHOD FOR HANDLING FOOD PORTIONS WITH A ROTATION DEVICE

(71) Applicant: WEBER MASCHINENBAU GMBH BREIDENBACH, Breidenbach (DE)

(72) Inventors: Joerg Schmeiser, Wiggensbach (DE); Christoph Kuhmichel, Bad Laasphe (DE)

(73) Assignee: Weber Maschinenbau GmbH Breidenbach, Breidenbach (DE)

( * ) Notice: Subject to any disclaimer, the term of this patent is extended or adjusted under 35 U.S.C. 154(b) by 159 days.

(21) Appl. No.: 16/230,141

(22) Filed: Dec. 21, 2018

(65) Prior Publication Data
US 2019/0193884 A1     Jun. 27, 2019

(30) Foreign Application Priority Data

Dec. 22, 2017   (DE) .......................... 102017223709.0

(51) Int. Cl.
*B65B 25/06*     (2006.01)
*B65B 35/58*     (2006.01)
(Continued)

(52) U.S. Cl.
CPC .............. *B65B 35/56* (2013.01); *B26D 7/32* (2013.01); *B65B 25/06* (2013.01); *B65B 35/24* (2013.01);
(Continued)

(58) Field of Classification Search
CPC ....... B65B 25/06; B65B 25/065; B65B 35/24; B65B 35/30; B65B 35/44; B65B 35/46;
(Continued)

(56) References Cited

U.S. PATENT DOCUMENTS 4,051,753 A * 10/1977 Everman et al. ........ B26D 7/32
                                                        83/29
6,520,314 B1 *  2/2003 Seiling .................... B65B 35/58
                                                        198/375
(Continued)

FOREIGN PATENT DOCUMENTS

DE        25 16 583 A1    10/1976
DE       3321584 A1 * 12/1984  ........... B65G 47/244
(Continued)

OTHER PUBLICATIONS

European Search Report dated May 14, 2019, Application No. 18215543.2-1017, Applicant Weber Maschinenbau GmbH Breidenbach, 10 Pages.

*Primary Examiner* — Stephen F. Gerrity
(74) *Attorney, Agent, or Firm* — Fitch, Even, Tabin & Flannery LLP

(57) ABSTRACT

The disclosure relates to an apparatus for handling food portions which comprises a first conveying device, a rotation device with a second conveying device forming a depositing surface which can be turned about a vertical axis, a third conveying device, and a control unit. The first conveying device is configured such that it can at least in regions be arranged above the rotation device. The control unit is adapted to control the first conveying device such that food portions are deposited in a format arrangement by the first conveying device from above onto the depositing surface of the rotation device, to control the rotation device to rotate the depositing surface with the food portions about the vertical axis, and to control the second conveying device to convey the turned food portions onward onto the third conveying device.

11 Claims, 7 Drawing Sheets

(51) Int. Cl.
  *B65B 35/46* (2006.01)
  *B65B 35/44* (2006.01)
  *B65B 35/56* (2006.01)
  *B65G 47/244* (2006.01)
  *B65B 35/50* (2006.01)
  *B26D 7/32* (2006.01)
  *B65B 35/24* (2006.01)
  *B65B 35/30* (2006.01)

(52) U.S. Cl.
  CPC .............. *B65B 35/30* (2013.01); *B65B 35/44* (2013.01); *B65B 35/46* (2013.01); *B65B 35/50* (2013.01); *B65B 35/58* (2013.01); *B65G 47/244* (2013.01); *B26D 2210/02* (2013.01); *B65G 2201/0202* (2013.01)

(58) Field of Classification Search
  CPC ......... B65B 35/50; B65B 35/56; B65B 35/58; B65G 47/244; B65G 2201/0202; B26D 7/32; B26D 2210/02
  USPC .................. 53/435, 447, 514, 517, 540, 544
  See application file for complete search history.

(56) References Cited

U.S. PATENT DOCUMENTS

| | | | | |
|---|---|---|---|---|
| 2010/0170201 | A1* | 7/2010 | Aquarius | ................ B65B 35/44 53/443 |
| 2012/0048681 | A1* | 3/2012 | Neutel | ................... B65G 47/90 198/610 |
| 2012/0098184 | A1* | 4/2012 | Lewalski et al. | ........ B26D 7/32 270/58.07 |
| 2012/0324840 | A1* | 12/2012 | Lang et al. | ........... B65B 25/065 53/544 |
| 2017/0050332 | A1 | 2/2017 | Bauer et al. | |

FOREIGN PATENT DOCUMENTS

| | | | | |
|---|---|---|---|---|
| DE | 195 15 199 A1 | 10/1996 | | |
| DE | 10 2011 105 583 A1 | 12/2012 | | |
| DE | 102017117292 A1 | 1/2019 | | |
| EP | 0497689 A1 * | 8/1992 | ............ | B65B 35/38 |
| GB | 1 576 718 A | 10/1980 | | |
| GB | 2 255 762 A | 11/1992 | | |

* cited by examiner

METHOD FOR HANDLING FOOD PORTIONS WITH A ROTATION DEVICE

CROSS-REFERENCE TO RELATED APPLICATIONS

This application claims foreign priority benefits under 35 U.S.C. § 119(a)-(d) to German patent application number DE 102017223709.0, filed Dec. 22, 2017, which is incorporated by reference in its entirety.

TECHNICAL FIELD

The present disclosure relates to an apparatus and a method for handling food portions with a rotation device.

BACKGROUND

Generic apparatuses are mainly employed for handling food portions which were produced by way of a food slicing machine (slicer) by slicing food products, in particular food loafs or food bars. They are primarily high-performance food slicers that produce more than 100 and in particular more than 1000 food slices per minute, so that an almost continuous or continuous portion flow is generated in the direction of a downstream packaging machine.

In order to enable continuous processing of the food portions, units for format formation and buffering, as well as for the placement into the package or transfer to the packaging machine are provided.

In particular, buffer sections are provided which make it possible to compensate for breaks or gaps in the product flow which can arise, for example, due to the food slicer being loaded with new food products. The proportion of these loading breaks can increase, the shorter the food products to be cut are.

However, the buffer sections in the region of the conveying and sorting sections downstream of the food slicer extend the length of the food processing system or the production line, respectively. This counteracts efficiency, especially since the space available in food processing facilities is often limited, and the size of the system increases the cleaning effort.

It is known in prior art that individual food portions or multiple food portions are rotated together. However, the devices known for this either have a large space requirement or require that additional buffer sections be provided.

For example, it is known in prior art to provide an articulated robot next to a production line with which a movable conveyor table can be aligned in the conveying direction of the production line, so that food portions can be received on the conveyor table in the conveying direction of the production line by moving a conveyor belt of the conveyor table. The robot then moves the conveyor table adjacent to a downstream conveyor belt and there turns the conveyor table in such a manner that the food portions arranged thereon can be deposited onto the downstream conveyor belt in the direction transverse to the conveying direction. The food portions thus rotated by 90° are further conveyed by the downstream conveyor belt in the conveying direction of the production line.

A drawback of this arrangement is that the robot acting from outside the production line requires a relatively large safety area, and in particular a relatively large housing of the robot workspace is therefore necessary which requires a large amount of space and entails limited accessibility to the production line.

SUMMARY

An object of the present disclosure is to provide an apparatus and a method for handling food portions which enable efficient handling of food portions.

According to the disclosure, an apparatus for handling food portions is provided and comprises a first conveying device, a rotation device with a second conveying device forming a depositing surface, and a third conveying device, where the first conveying device is adapted to deposit food portions in a format arrangement from above onto the depositing surface of the rotation device, where the rotation device is adapted to rotate the depositing surface with the food portions about a vertical axis, and where the second conveying device is adapted to convey the food portions onward onto the third conveying device.

The first conveying device, the second conveying device, and the third conveying device are arranged in this sequence in a conveying direction of the production line comprising them. The indication of direction of the conveying direction is in each case in the horizontal plane, where the conveying devices can also be configured such that they extend slightly upwardly or downwardly inclined. However, this is not taken into account hereafter for the indication of the conveying direction.

When the food portions are deposited from above onto the depositing surface, the first conveying device is disposed above the second conveying device.

The conveying devices each comprises drives. Furthermore, a central control unit is provided and adapted to control the respective drives according to the disclosure for conveying, rotating and moving. The control unit is in particular an electronic control unit, the configuration of which is determined by its programming.

The conveying device comprises in particular a conveyor belt which can be formed from continuous belt material or from individual belts or chains with or without additional product carriers. Alternatively, individually movable product carriers that carry individual food portions or entire format arrangements of food portions can also be employed in the conveying device.

In one embodiment, the second conveying device can always convey the food portions only in the direction in which the rotation device is oriented.

When conveying the food portions with the first conveying device onto the second conveying device, the food portions can be deposited from above onto the stationary second conveying device, so that no conveying action of the second conveying device is necessary.

If the conveying direction of the second conveying device is now at an angle to the conveying direction of the first conveying device, then the food portions, after being deposited on the second conveying device, are arranged at this angle relative to the conveying direction of the second conveying device. If the second conveying device is then by the rotation device in its conveying direction aligned to the third conveying device, then the food portions can be conveyed onward respectively turned onto the third conveying device.

The second conveying device is a conveyor belt which extends over the entire width of the depositing surface.

In another embodiment, the second conveying device comprises several separately drivable conveyor belts which are arranged parallel to one another in the depositing surface. Conveying in the conveying direction of the second conveying device in a manner that is independent of the lane is then possible. However, the food portions are deposited on the second conveying device in particular such that they each come to rest only on one conveyor belt.

In particular the second conveying device is aligned in top view turned by approximately 90° relative to the conveying direction of the first conveying device, while the food portions are conveyed from the first conveying device onto the second conveying device.

In one embodiment, the direction of rotation comprises a rotary wheel rotating about a horizontal axis on which the second conveying device is mounted rotatable about a vertical axis. Due to the rotation about the horizontal axis, the second conveying device can be moved on a circular path. The second conveying device is decoupled from the rotation about the horizontal axis, i.e., moves only on the circular path, but does not rotate about the horizontal axis. Furthermore, the second conveying device is mounted rotatable about a vertical axis.

This makes it possible that the second conveying device is first rotated in a desired orientation about the vertical axis and then arranged below the first conveying device, so that at least one food product from the first conveying device can be deposited from above onto the depositing surface in the form of the second conveying device. The rotary wheel rotates about the horizontal axis, so that the second conveying device is respectively driven on the circular path towards the third conveying device. Before, during or after this procedure, the second conveying device is turned about the vertical axis. The food portions can then be turned on the depositing surface formed by the second conveying device.

In particular several second conveying devices distributed circumferentially on the rotary wheel are each mounted separately rotatable about the vertical axes, where each of the several second conveying devices provides a depositing surface. For example, a second conveying device can then be simultaneously loaded with food portions by the first conveying device, while food portions are conveyed from another second conveying device to the third conveying device.

The disclosure further provides an apparatus for handling food portions which comprises a first conveying device, a rotation device with a second conveying device forming a depositing surface, and a third conveying device, where the rotation device comprises a movement device arranged below the depositing surface and adapted to rotate the depositing surface with the food portions, and where the second conveying device is adapted to convey the food portions onward onto the third conveying device.

The arrangement of the movement device below the depositing surface allows the rotation device to be configured in a space-saving manner while still being configured efficiently. In particular, the movement device can be a robot arm or a mechanism which enables the second conveying device to at least be turned. For example, the rotation device can provide an actively rotatable vertical axis, the turning of which causes the second conveying device to turn, in particular for the reason that the second conveying device is attached thereonto.

The disclosure further provides an apparatus for handling food portions comprising a first conveying device, a rotation device with a second conveying device forming a depositing surface, and with a robot which can move and/or turn the depositing surface, and comprises a third conveying device, where the robot is attached to a frame above the second conveying device, and where the second conveying device is adapted to convey the food portions onto the third conveying device.

The robot is in particular a gantry robot which can move the depositing surface linearly between the first and third conveying device and in doing so turn it.

In particular, the conveying direction of the first conveying device and the conveying direction of the third conveying device are the same.

In a preferred embodiment, the first conveying device is a retraction belt which can be moved above the depositing surface of the rotation device. With the retraction belt, the retraction roller provided downstream can be displaceable in the conveying direction. By simultaneously conveying by way of circulating the belt and moving the retraction roller, it can be achieved that the food portions are deposited at a desired position from above on the depositing surface of the second conveying device. Since the second conveying device can be arranged in a turned manner relative to the first conveying device, this depositing can take place when the conveying directions of the first and the second conveying devices are oriented in different directions, so that the food portions are arranged on the second conveying device in a relative orientation with respect to the respective conveying direction that differs from the first conveying device.

But it is also possible that the first conveying device is a normal conveyor belt, instead of a retraction belt, and is linearly displaceable in the conveying direction and can be moved above the second conveying device. In such an embodiment, however, it is advantageous to have sufficient buffer space be provided in front of the first conveying device, since conveyance by an upstream conveying device onto the first conveying device must possibly be interrupted if the latter is moved in the downstream conveying direction.

The robot can be a gantry robot. The gantry robot enables, in particular, that the depositing surface can be moved to and fro between the first and the third conveying devices and can then or independently thereof be turned.

The first conveying device is in particular a retraction belt which can be moved above the depositing surface of the rotation device. The retraction belt comprises in particular a downstream retraction roller which can be moved in the conveying direction. The conveyor belt runs around the retraction roller and thereby makes a deposit possible exactly at the retraction roller position when the conveyor belt of the first conveying device simultaneously rotates around the retraction roller.

Since the retraction roller can be arranged on the depositing surface of the second conveying device, the exact placement of the food portions can then be effected on the depositing surface of the second conveying device.

In one embodiment, the depositing surface of the second conveying device is adjustable in the height direction, so that the depositing surface can be moved out from the plane of the third conveying device for the turning motion, and so that the depositing surface is movable to the same height level with the third conveying device to convey food portions from the depositing surface onto the third conveying device. This makes it possible that the depositing surface in the plane of the third conveying device can connect flush thereto. The belt transition can thus be kept as small as possible in order to be gentle on the transported food portions. A turning motion is nevertheless enabled when the depositing surface is moved out from the plane of the third conveying device.

The rotation device is adapted, in particular, such that the depositing surface is movable in the conveying direction of the production line, so that the depositing surface can be turned in a first position and the depositing surface in a second position adjoins the third conveying device, so that food portions can be conveyed from the depositing surface in the conveying direction of the production line onto the third conveying device. This also makes it possible for the depositing surface to be flush with the third conveying device in order to convey the food portions onward from the second conveying device to the third conveying device. On the other hand, enough distance between the depositing surface and the third conveying device can be obtained, so that the depositing surface can be turned according to its corner or diagonal dimension, respectively.

In one embodiment, the second conveying device is a retraction belt. This allows an upstream or downstream retraction roller of the second conveying device to be movable in the conveying direction of the second conveying device, whereby the second conveying device can be connected flush to the first conveying device and/or the third conveying device, or retracted therefrom, respectively, in order to allow for the turning motion.

In one embodiment, the apparatus for handling food portions comprises a modular cassette which can be inserted into a corresponding receptacle in the apparatus and can be removed from this receptacle. The modular cassette comprises the rotation device and all its drives and forms a module in the conveyor line which can be integrated thereinto as needed. The cassette with the rotation device can in particular be replaced with a cassette which comprises only a simple conveying device, for example, a continuous conveyor belt without a rotation device when the rotation function is not needed. More buffer area can then be available at this point for further food portions.

The rotation device is designed in particular such that it does not project beyond the lateral boundaries of the first and/or the third conveying device. The rotation device can therefore be provided, without the apparatus for handling food portions being wider.

In one embodiment, the rotation device is configured such that the second conveying device can be turned about an eccentrically arranged vertical axis. The axis is provided in particular on a side edge or a corner of the second conveying device.

Alternatively or additionally, it is possible that a conveying device adjacent to the rotation device is raised or lowered. Enough space for rotating the rotation device can then be provided without the retraction belt or a longitudinal or vertical motion of the rotation device. In particular, raising the adjacent conveying device in a one-sided manner on its side adjacent to the rotation device is sufficient. The food portions can then continue to be removed or received at the other end of the conveying device. In particular, only one side of the conveying device is raised, so that the conveying device is inclined by at least 5°, but in particular less than 10°.

The disclosure further provides a method for producing packaged food portions using a production line in which a food product is first sliced to produce food portions, the food portions are conveyed along a conveying direction of the production line, the food portions are arranged in a format arrangement, the food portions arranged in the format arrangement are rotated by a rotation device integrated into the production line, and the food portions are finally packaged.

The efficiency of the rotation can be increased by rotating the entire format. Due to the fact that the rotation device is integrated into the production line, handling devices engaging laterally can be avoided, thereby requiring a smaller safety area and achieving higher system efficiency.

The production line or the food processing system, respectively, comprises in particular a linked sequence of the following devices: a food slicer for slicing food products in one or more lanes, a portioning and depositing device, a grouping and aligning device, a format forming device, a buffer device, a separating device, for merging multiple lanes to one lane, and a packaging machine, in particular a tubular bag packaging machine. A multi-lane production line has several lanes that extend in parallel in the conveying direction of the production line. The food portions in the individual lanes can be aligned relative to each other, in particular be arranged at the same position in the direction of the conveying direction of the production line, and then form a row of food portions, each comprising one food portion for every lane.

The step of arranging the food portions in the format arrangement comprises, in particular, that the individual food portions are aligned relative to each other in a predetermined relative arrangement, this relative arrangement being maintained during rotation. No re-arrangement in format needs to take place after the rotation, but the food portions can be further processed directly in their relative arrangement.

The rotation device comprises, in particular, a conveying device which is disposed at an angle or transverse to the conveying direction of the production line, while the food portions arranged in the format arrangement are deposited thereon, where the conveying device of the rotation device is then aligned by turning such that its conveying direction points in the conveying direction of the production line, where the food portions can be conveyed away from the rotation device. The angle is in particular greater than or equal to 20°, greater than or equal to 45°, greater than or equal to 70°, or approximately 90°.

In one embodiment, the food portions arranged in the format arrangement are conveyed onto the rotation device by way of a retraction belt, where a movable retraction roller of the retraction belt is moved at a relative speed in the conveying direction of the retraction belt to above the rotation device, where the retraction belt is operated at a conveying speed which is adapted to the relative speed.

The drive speed of the retraction belt can in particular be equal to the relative speed of the motion of the movable retraction roller above the rotation device, so that the retraction belt is pulled out from under substantially stationary food portions, and the latter are deposited on the depositing surface of the rotation device while maintaining their format arrangement.

The rotation device can be adjusted in height before, during, and/or after the rotation to enable rotating and/or conveying the food portions arranged in the format arrangement. The rotation device can in particular be adjusted to a height level which is higher or lower than a downstream conveying device in order to enable the rotation without contact between the conveying devices and their food portions. Furthermore, the rotation device can be adjusted to the same height level as a downstream conveying device to allow the food portions to be conveyed away. In particular, it can be provided that the rotation device, in addition to the rotational motion, moves exclusively in the vertical direction.

In one embodiment, the rotation device is adjusted in length before, during, and/or after the rotation to enable rotating and/or conveying the food portions that are arranged in the format arrangement. The rotation device can be, in particular, arranged spaced from upstream or downstream conveying devices in order to enable the rotation without contact between the conveying devices and their food portions. In addition, the rotation device can be connected to the downstream conveying device by way of adjustment in length in order to enable the food portions to be conveyed from the rotation device onto the downstream conveying device.

Advantageously, the rotation device is moved only within the production line. The rotation device is moved, in particular, within the lateral boundaries of the upstream and/or downstream conveying device.

In one embodiment, the food product is sliced in several lanes, wherein at least two food portions from different lanes are by rotation arranged in one lane and then packaged together. This is made possible, in particular, in that the food portions of different lanes arranged in a format set are turned, so that the food portions of different lanes are arranged one behind the other in the direction of production.

In particular, at least two food portions are grouped after slicing, where the grouped food portions are arranged in the format arrangement. When slicing the food product, the individual slices are first deposited on each other as part of the portioning. Separating sheets can be introduced between the slices of the food portion. The separating sheets are in particular made of paper or plastic film. The separating sheets can protrude in particular on the upstream side beyond the respective slices that they separate.

After portioning, the food portions are during grouping each moved in groups on different conveying devices arranged in parallel and optionally aligned relative to each other. The aligned and grouped food portions are then conveyed onto a further conveying device on which the format is formed, where a buffer device can also be provided in this region. In particular, the food portions arranged in the format arrangement are rotated by the rotation device by 90°. The food portions of a row previously arranged in parallel lanes are thereby respectively arranged in one lane. This enables, in particular, that food portions produced from different food products in different lanes can be combined in one lane and packaged together.

The food portions are each rotated preferably by 90° about the vertical axis. The rotation of the food portions is performed after format formation in which the food portions are precisely aligned relative to each other and arranged at predetermined distances from each other in a format arrangement, namely advantageously already as needed in the package or for insertion into a package. In particular grouping of the food portions, for example, of always two food portions into one group, which is then packaged as a group, can also take place already when the format is formed. Several grouped food portions can be rotated together as a format arrangement.

As can be seen in the preceding embodiments, the rotation device comprises at least one driven conveyor belt for dispensing and/or receiving the food portions in a format arrangement. In particular, a continuous broad conveyor belt or alternatively individually driven lanes are provided on the rotation device.

When receiving a format arrangement of food portions from an upstream conveying device, the rotation device is initially aligned such that its conveying direction extends transverse to the production line, and once the food portions are arranged thereon is aligned such that it extends in the conveying direction of the production line and the food portions can be conveyed away accordingly. In one embodiment, the rotation device can be provided as a modular rotary cassette, which comprises all the necessary drives and therefore forms a self-contained module that can be integrated into the production line as needed. The rotary cassette can therefore be exchanged for a simple cassette with a continuous conveyor belt if no rotational function is needed.

Embodiments according to the disclosure shall be described below by way of example with reference to the attached drawings.

DETAILED DESCRIPTION

Figure 1:
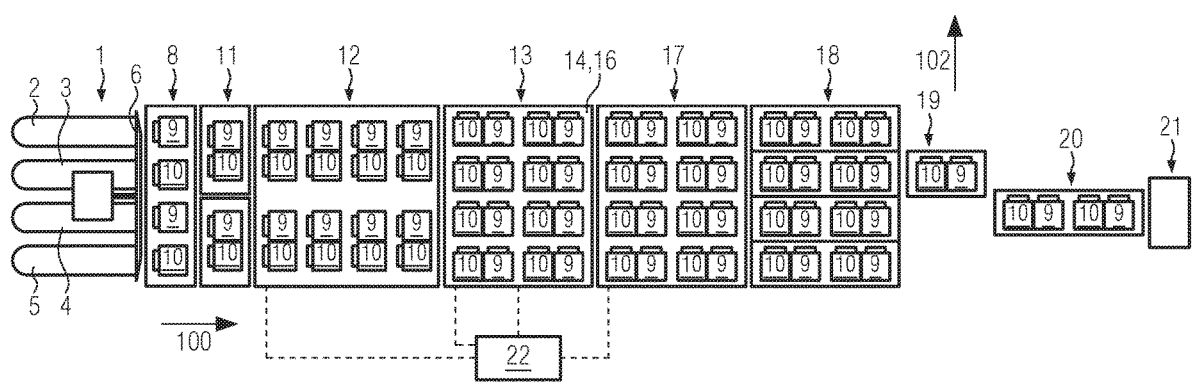
FIG. 1 shows a top view of a production line with an apparatus according to the disclosure for handling food portions.

FIG. 1 shows a top view of a food production line, where several food products 2, 3, 4, 5 are sliced in a food slicer 1 using a rotating knife 6. Food products 2, 3, 4, 5 can be, for example, cheese, sausage or ham bars. Food products 2, 4 in the present embodiment differ from food products 3, 5. The disclosure basically can also be used for the same food products 2, 3, 4, 5 in the adjacent parallel lanes. For example, first food products 2, 4 can be ham bars, and second food products 3, 5 sausage bars. Alternatively, different cheeses can be sliced, and the food portions can then be combined.

The slicing action by food slicer 1 produces food portions, each consisting, in particular, of stacked or shingled food slices, where separating sheets 7 which are shot in between the slices during slicing can be provided between the individual slices. Separating sheets 7 extend beyond the slices of the food portions, in particular, in the upstream direction.

The food portions are produced by stacking food slices on a portion tray 8. Due to the different food products 2, 4 and 3, 5, food portions 9, 10 of different types are alternately formed, namely first food portions 9 and second food portions 10. In the present embodiment, four lanes of food portions 9, 10 are provided adjacent to each other, where each lane first comprises only either first or second food portions 9, 10. Each row of food portions 9, 10 has four food portions, each with two first food portions 9 and two second food portions 10. Portion tray 8 is in particular a conveying device, such as a conveyor belt, which can convey completed food portions 9, 10 in a conveying direction 100 of the production line.

The food portions are then moved to an alignment and grouping device 11 in which the food portions can be moved relative to each other. For example, individually controllable conveying devices are provided for this with different conveying speeds in conveying direction 100 of the production line or in transverse direction 102. Food portions 9, 10 are aligned by aligning and grouping device 11 such that they can be conveyed onto a first conveying device 12 representing a format-forming and buffering device. Food portions 9, 10 are then arranged in a desired format arrangement on first conveying device 12, meaning arranged in a predetermined arrangement relative to each other.

The food portion rows in the transverse direction 102 each consist alternately of first and second food portions 9, 10 and the respective lanes in conveying direction 100 always of one type of food portion 9 or 10.

The format arrangement of food portions 9, 10 is then conveyed in conveying direction 100 of the production line onto a depositing surface 14 of a rotation device 13 which can be turned about a vertical axis 15.

FIG. 1 shows depositing surface 14 already in the turned position. By turning depositing surface 14 of rotation device 13, food portions 9, 10 arranged thereon can be turned together in the format set about vertical axis 15, in the present embodiment by 90°. Now first and second food portions 9, 10 are therefore alternately arranged in one lane, as shown in FIG. 1.

Depositing surface 14 is provided by a second conveying device 16 which is, in particular, a conveyor belt. In an initial position of depositing surface 14 of rotation device 13, conveying direction 101 of the second conveying device is oriented in transverse direction 102 to conveying direction 100 of the production line. In the turned position shown in FIGS. 1 and 2, conveying direction 101 of second conveying device 16 is oriented in the direction of conveying direction 100 of the production line.

Food portions 9, 10 rotated by rotation device 13 while maintaining their format arrangement are then in any case conveyed onward by second conveying device 16 onto a third conveying device 17 which constitutes a further buffer device, in particular in the form of a conveyor belt.

Third conveying device 17 is followed by a separating device 18 and a combining device 19, which consists, for example, of a conveyor belt displaceable in transverse direction 102, and allows food portions 9, 10 of the various lanes to be combined on a single lane 20 of a packaging machine 21. In particular, a first and a second food portion 9, 10 are successively arranged on single lane 20, so that they can be packaged together.

Figure 2:
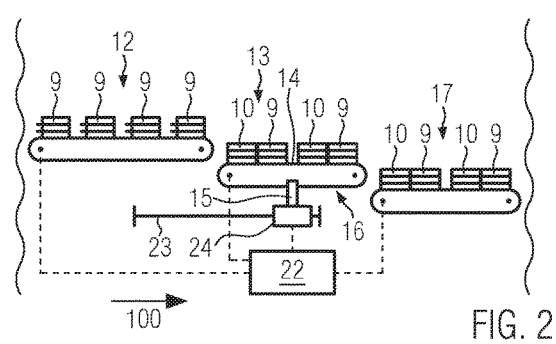
FIG. 2 shows a side view of a first embodiment of an apparatus according to the disclosure for handling food portions.

FIG. 2 shows a side view of the embodiment of the apparatus for handling food portions according to the disclosure from FIG. 1, where the apparatus comprises first conveying device 12, rotation device 13 with second conveying device 16, and a third conveying device 17, each of which can be controlled by a central control unit 22. Furthermore, it is also possible that control unit 22 also centrally controls the other components of the production line of FIG. 1.

First conveying device 12 and third conveying device 17 are each arranged in a stationary manner. Second conveying device 16 of rotation device 13 can be moved along conveying direction 100 of the production line on a linear guide 23. For this purpose, a carriage 24 is provided which can be moved by a drive on linear guide 23 controlled by control unit 22. Second conveying device 16 is arranged on carriage 24 in a manner that can be turned about vertical axis 15, where a drive controlled by control unit 22 is also provided for the rotational motion.

As shown in FIG. 2, the upper side and depositing surface 14 of second conveying device 16 are arranged just below the underside of first conveying device 12, so that second conveying device 16 can be moved under first conveying device 12. If carriage 24 is now moved at the same or substantially the same conveying speed as first conveying device 12 in conveying direction 100 of the production line along linear guide 23, then food portions 9, 10 can be deposited from above onto depositing surface 14 of rotation device 13, without second conveying device 16 needing to perform a conveying motion for this. This allows depositing surface 14 and therefore second conveying device 16 to be arranged in an initial position in which conveying direction 100 of the production line is not aligned with conveying direction 101 of second conveying device 16, but is turned at an angle thereto.

In particular second conveying device 16 in the initial position is turned such that its conveying direction 101 is aligned in transverse direction 102. Once the format arrangement of food portions 9, 10 has been arranged on depositing surface 14, second conveying device 16 is turned about vertical axis 15, so that conveying direction 101 of second conveying device 16 is aligned with the conveying direction of production line 100 and thereby also with the conveying direction of third conveying device 17.

First and second food portions 9, 10 are can then be conveyed from second conveying device 16 onto third conveying device 17. Carriage 24 with vertical axis 15 represents a movement device arranged below depositing surface 14 with which depositing surface 14 with food portions 9, 10 can be rotated.

As can be seen in FIG. 2, second conveying device 16 is arranged just above third conveying device 17, so that turning is made possible without conveying devices 16, 17 contacting each another.

Alternatively, a height adjustment for second conveying device 16 can be provided and likewise be controlled by central control unit 22, so that second conveying device 16 can be taken to the same height with third conveying device 17 when it is in the turned position, so that food portions 9, 10 can be conveyed at the same level and in a flush manner from second conveying device 16 to third conveying device 17.

As can be seen in FIG. 1 and FIG. 2, rotation device 13 is configured for rotating an entire format arrangement of food portions and integrated into the production line. Food portions 9, 10 from different lanes can consequently be combined in several lanes, this being particularly advantageous in the production of so-called twin stacks, i.e., combinations of two respective food portions 9, 10, which are packaged together in a tubular bag in a tubular bag packaging machine.

Combining device 19 can alternatively also be a plate distributor in which food portions 9, 10 from several lanes can be combined onto one lane by way of transversely displaceable plate elements.

FIGS. 3 to 8 show a second embodiment of the disclosure which is distinguished primarily by the fact that first conveying device 25 is configured as a retraction belt and that turning and height adjustment of second conveying device 16 can be performed in rotation device 26.

Figure 3:
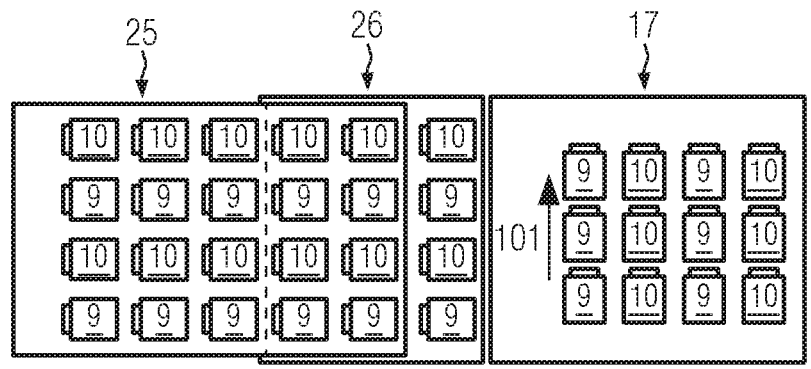
FIG. 3 shows a top view of a second embodiment of an apparatus according to the disclosure for handling food portions with the rotation device in an initial position.
Figure 4:
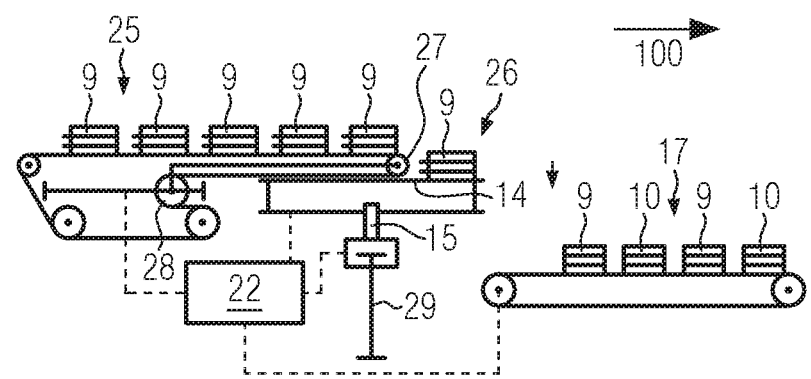
FIG. 4 shows the side view of FIG. 3.

In FIGS. 3 and 4, the downstream retraction roller 27 of first conveying device 25, which is displaceable along conveying direction 100, is arranged above depositing surface 14 of second conveying device 16. The front retracting roller 27 is continuously retracted against conveying direction 100, where the tension of the retraction belt is maintained by a respective motion of compensation roller 28. Retraction roller 27 and compensation roller 28 are arranged on a displaceable carrier. Movement of retraction roller 27 can be effected by a drive which displaces the carrier in a linear manner.

The conveyor belt of first conveying device 24 is there moved such that food portions 9, 10 arranged thereon substantially remain in place while the retraction belt is pulled out from under them, so that they come to rest on depositing surface 14 of second conveying device 16 of rotation device 26 disposed directly therebelow.

Figure 5:
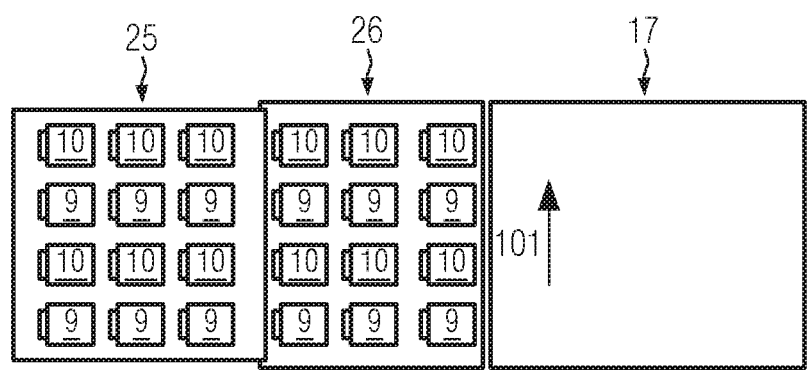
FIG. 5 shows a top view of the second embodiment with the first conveying device retracted.
Figure 6:
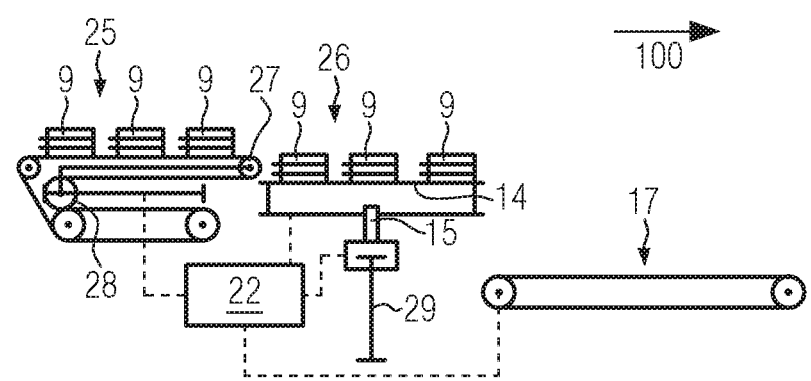
FIG. 6 shows the side view of FIG. 5.
Figure 7:
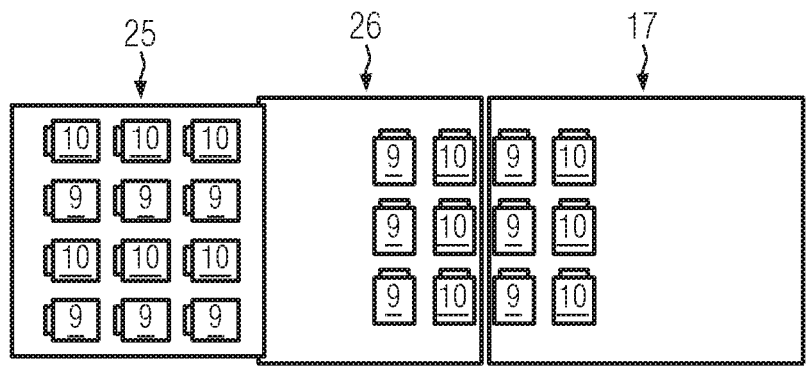
FIG. 7 shows a top view of the second embodiment with the rotation device in the turned position.
Figure 8:
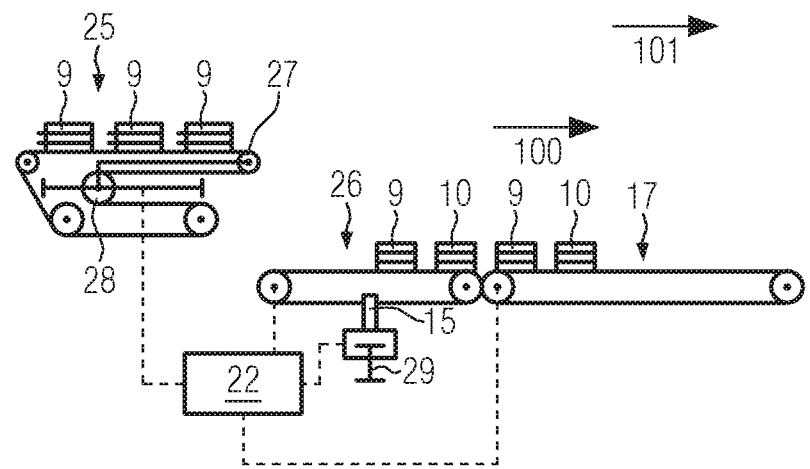
FIG. 8 shows the side view of FIG. 7.

The completely retracted state of the retraction belt is then shown in FIGS. 5 and 6, where it can be seen that a complete format set of food products 9, 10 rests on depositing surface 14. Depositing surface 14 is now turned by way of rotation device 26 from the initial position to the turned position, so that conveying direction 101 of second conveying device 16 is aligned with the conveying direction of third conveying device 17, which corresponds, in particular, to conveying direction 100 of the production line. Before, during or after second conveying device 16 has been turned, second conveying device 16 is moved vertically by height adjustment device 29, so that contact between conveying devices 25, 16 and 17 among each other and food portions 9, 10 arranged thereon is prevented.

Alternatively, it is also possible that no height adjustment device is employed, but that the retraction belt is retracted so far that any undesired contact between the conveying device 25 and second conveying device 17 or food portions 9, 10 arranged thereon, respectively, cannot occur during the turning motion.

In addition, second conveying device 16 can be arranged slightly above third conveying device 17, so that turning is possible and food portions 9, 10 can still be conveyed from second conveying device 16 to the third conveying device 17 without any significant step. The compensation roller is therefore always moved along with retraction roller 27 exactly such that the belt tension of first conveying device 24 is maintained.

A control unit 22 is provided also in the second embodiment and can control the respective drives of first conveying device 25, the adjustment of retraction roller 27 and compensation roller 28, the second conveying device 16, the rotation of second conveying device 16 about vertical axis 15, height adjustment device 29, and third conveying device 17.

In the second embodiment according to FIGS. 3 to 8, the entire format of food portions 9, 10 can therefore be relocated from first conveying device 25 onto depositing surface 14 of second conveying device 16 by driving the conveyor belt of first conveying device 25 and retracting retraction roller 27. Second conveying device 16 is at the moment of receiving the food portions transverse to conveying direction 100 of the production line and is disposed at a slightly lower height level than upstream first conveying device 25. Once all food portions 9, 10 of the format arrangement have been deposited on second conveying device 16, the entire format is rotated by 90° and conveyed onto downstream third conveying device 17 which is configured to buffer at least one format arrangement of food portions 9, 10. The position of vertical axis of rotation 15 there remains unchanged, but the height level of second conveying device 17 can be changed using height adjustment device 29 so as not to contact the belt edges of conveying device 17, 25 arranged downstream or upstream during rotation.

During rotation, rotation device 26 can either slightly raise or lower second conveying device 16 by way of height adjustment device 29 and move it back to the previous position after the turning motion.

Figure 9:
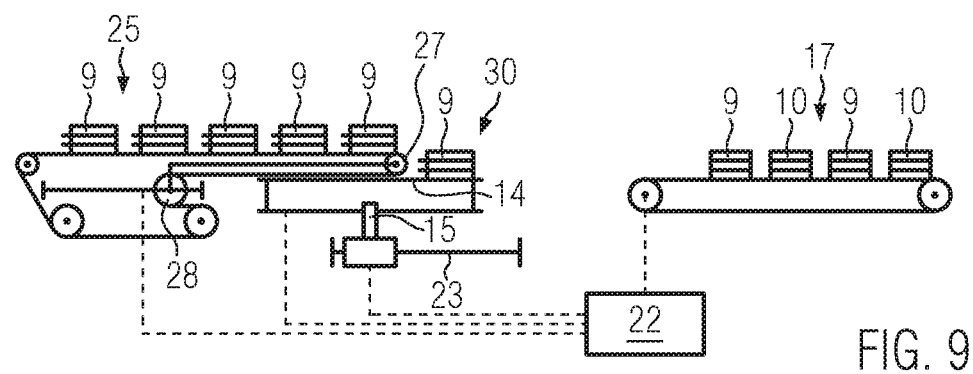
FIG. 9 shows a side view of a third embodiment of an apparatus according to the disclosure for handling food portions.

FIG. 9 shows a third embodiment in which rotation device 30 is configured substantially like in the first embodiment, i.e., rotation device 30 has a linear guide 31 in conveying direction 100 of the production line. A carriage 24 can again be moved thereon on which second conveying device 16 is provided in a manner that can be turned about vertical axis 15. Provided as first conveying device 25 is a retraction belt with which food portions 9, 10 can be deposited onto second conveying device 16 in a format arrangement. Furthermore, third conveying device 17 can be arranged in the third embodiment according to FIG. 9 at the same height as second conveying device 16, and contact among the conveying devices or with food portions 9, 10 can be prevented by length adjustment of second conveying device 16. The height level of depositing surface 14 can therefore be maintained and only the vertical axis of rotation 15 is displaced in conveying direction 100 of the production line. Due to the movement of second conveying device 16 in conveying direction 100, a proper belt transition between second conveying device 16 and third conveying device 17 can be ensured.

Figure 10:
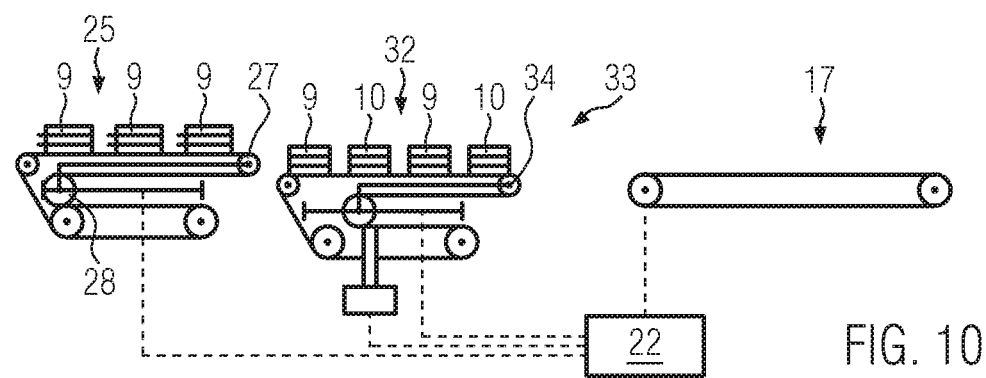
FIG. 10 shows a side view of a fourth embodiment of an apparatus according to the disclosure for handling food portions.

Like in the second and the third embodiments, first conveying device 25 in the fourth embodiment of the disclosure according to FIG. 10 is also formed as a retraction belt. However, second conveying device 33 of rotation device 32 is now also configured as a retraction belt. Retraction roller 34 can there be positioned in the retracted position shown in FIG. 10, while rotation device 32 rotates second conveying device 33. Thereafter, retraction roller 34 can be extended so that it enables a flush belt transition between second conveying device 33 and third conveying device 17.

Figure 11:
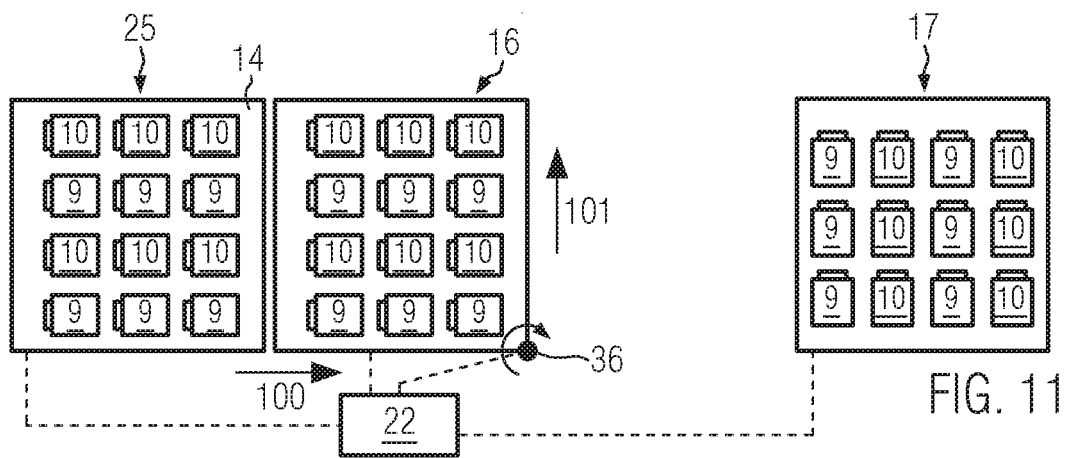
FIG. 11 shows a top view of a fifth embodiment of an apparatus according to the disclosure for handling food portions with the rotation device in an initial position.
Figure 12:
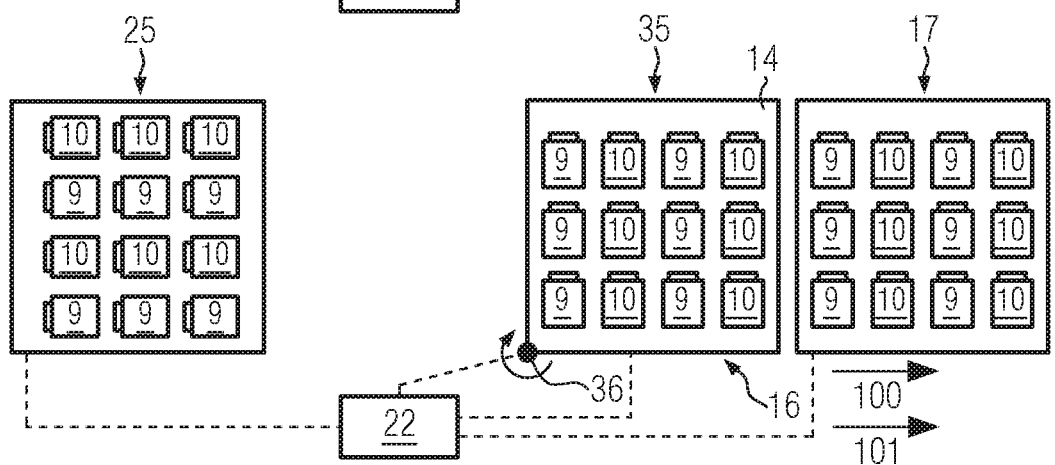
FIG. 12 shows a top view of a fifth embodiment of an apparatus according to the disclosure for handling food portions with the rotation device in a turned position.

In a fifth embodiment according to FIGS. 11 and 12, a rotation device 35 is provided which is characterized by an eccentric vertical axis of rotation 36 on second conveying device 16. By way of a first conveying device 25 formed as a retraction belt, food portions 9, 10 are again applied on depositing surface 14 of second conveying device 16, while the latter is disposed in an initial position in which its conveying direction 101 is at an angle to conveying direction 100 of the production line. The angle is advantageously 90°. Once a format set of food portions 9, 10 has been arranged on depositing surface 14 as shown in FIG. 11, second conveying device 16 is rotated about vertical axis of rotation 36 until second conveying device 16 adjoins third conveying device 17 and conveying direction 101 of second conveying device 16 is aligned with conveying direction 100 of third conveying device 17. Food portions 9, 10 can then be conveyed from second conveying device 16 onto third conveying device 17. In the present embodiment, the axis of rotation 36 is spatially fixed. But it can also be provided that axis of rotation 36 is movable in conveying direction 100 of the production line linearly or according to a predetermined path, such as a lane contour. This enables, for example, that depositing surface 14 can be moved below first conveying device 12, which is then not formed as a retraction belt, but as a normal conveyor belt.

Figure 13:
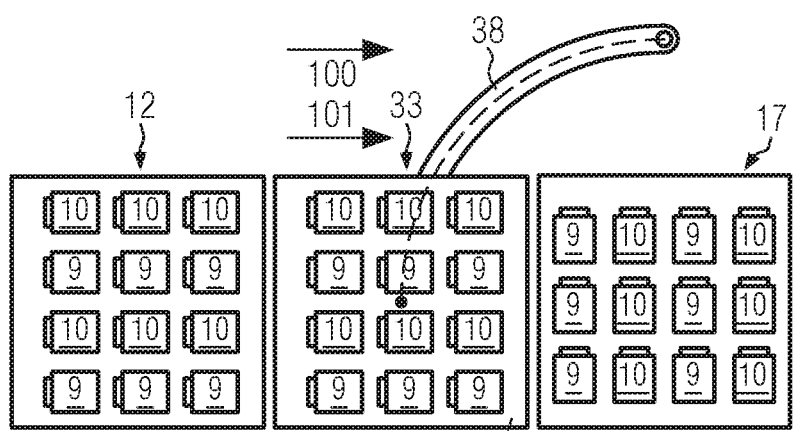
FIG. 13 shows a top view of a sixth embodiment of an apparatus according to the disclosure for handling food portions with the rotation device in an initial position.
Figure 14:
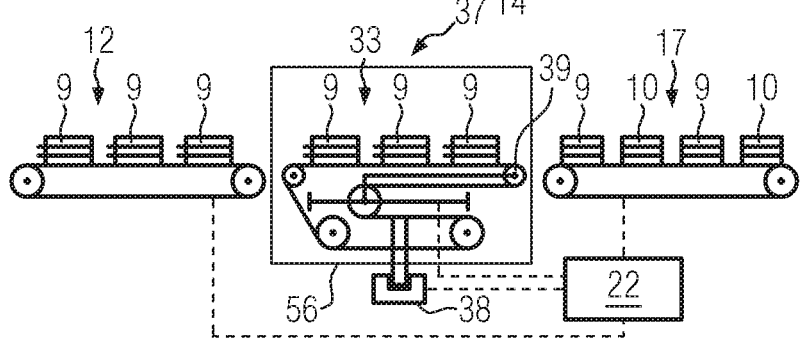
FIG. 14 shows the side view of FIG. 13.
Figure 15:
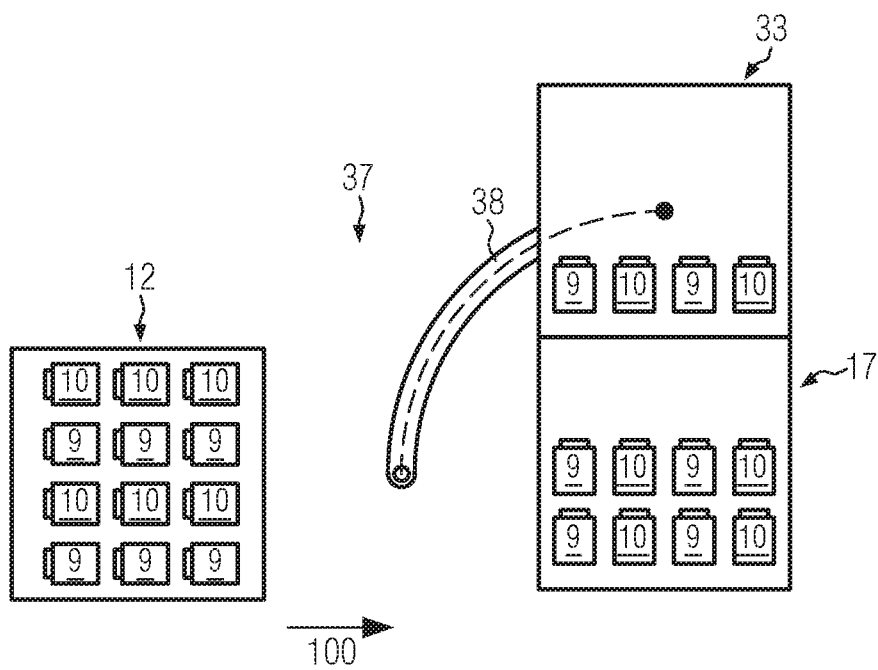
FIG. 15 shows a top view of a sixth embodiment of an apparatus according to the disclosure for handling food portions with the rotation device in a turned position.

A sixth embodiment of the disclosure is shown in FIGS. 13 to 15. The sixth embodiment is characterized in that rotation device 37 is realized by a movement device disposed below depositing surface 14. The present embodiment is, for example, a slotted guide 38 with which second conveying device 16 can be moved from the initial position shown in FIG. 13 to the turned position shown in FIG. 15. In the initial position, second conveying device 16 is oriented such that its conveying direction 101 corresponds to conveying direction 100 of the production line. Food portions 9, 10 can therefore be conveyed directly from first conveying device 12 onto second conveying device 33 in a simple manner.

Second conveying device 33 is configured, in particular, as a retraction belt, as shown in FIG. 14. When a complete format set is arranged on second conveying device 33, then second conveying device 33 is moved along slotted guide 38, so that it is arranged in the turned position adjacent to third conveying device 17.

In the embodiment illustrated, this results in the second conveying device 33 turning by approx. 90°. Retraction roller 39 of second conveying device 33 is then taken to the extended position above third conveying device 17 and slowly retracted while conveying individual food portions 9, 10 from second conveying device 33 onto the third conveying device. Food portions 9, 10 are there conveyed in the format set onto third conveying device 17. The entire format set is therefore rotated by 90° by way of rotation device 37. In particular, first conveying device 12 can be at the same height level as second conveying device 33, which enables an advantageous belt transition of food portions 9, 10 from first conveying device 12 to second conveying device 33.

As an alternative to slotted guide 38 illustrated, an integrated robot, a hinged articulation, or a pneumatically or hydraulically controlled cantilever arm can be provided under second conveying device 33.

The movement device is configured, in particular, to swing out depositing surface 14 and to move it in regions over third conveying device 17. In one embodiment, an additional height adjustment can be provided at the center of rotation of rotation device 37, for example, using a cylinder, a worm, or a spindle. Furthermore, it can be provided to arrange the movement device including the axis of rotation in an inclined manner to compensate for differences in height. An optional pivot mechanism can be provided to slightly incline depositing surface 14.

After rotating food portions 9, 10 of a format arrangement by 90°, second conveying device 33 is actuated to deliver food portions 9, 10 from depositing surface 14 to third conveying device 17 which is configured to buffer at least one format arrangement of food portions 9, 10. Alternatively, however, the second conveying device can also be an ordinary conveyor belt and no retraction belt. The movement device of the rotation device is then configured such that the second conveying device can be moved above the third conveying device, while the food portions are delivered from the second conveying device to the third conveying device.

In a further embodiment, it is possible to provide two rotation devices and a separable second conveying device, so that half a format arrangement of food portions can then be turned separately before they are again deposited together on the third conveying device. This allows for weight balance and less lateral deflection. In particular, one rotation device is respectively arranged on each side of the production line.

As shown in FIG. 14, rotation device 37 can be integrated in a modular cassette 56. Cassette 56 comprises rotation device 37 including second conveying device 33 as well as slotted guide 38 and their drives. Cassette 56 therefore forms a self-contained module that can be integrated into the production line as needed. Cassette 55 can therefore in particular be exchanged for a simple cassette with a continuous conveyor belt if no rotational function is needed.

Figure 16:
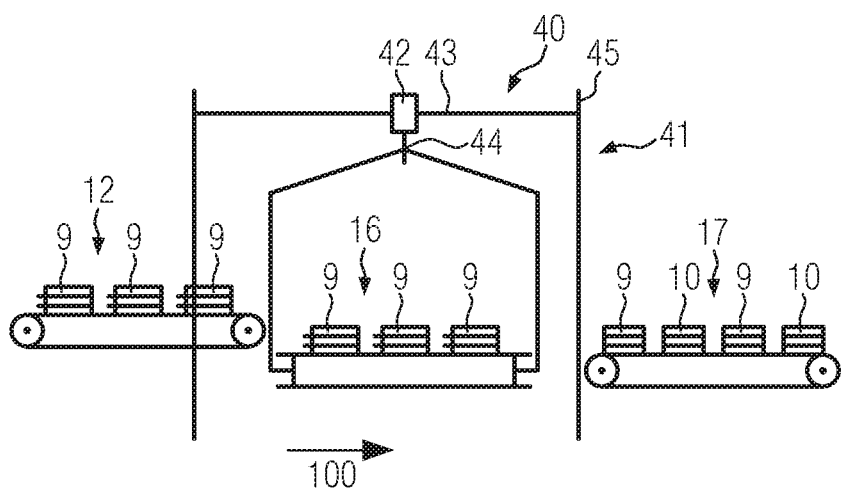
FIG. 16 shows a side view of a seventh embodiment of an apparatus according to the disclosure for handling food portions.

In a seventh embodiment according to FIG. 16, a rotation device 40 comprises a gantry robot 41 in which a carriage 42 can be moved at least along a linear guide 43.

Linear guide 43 extends in conveying direction 100 of the production line. Second conveying device 16 is suspended rotatable about a vertical axis 44 on carriage 42. Second conveying device 16 can now be aligned, as shown in FIG. 14, such that its conveying direction 101 is transverse to conveying direction 100 of the production line. Second conveying device 16 is then moved by way of gantry robot 41 under first conveying device 12. Food portions 9, 10 are then arranged on second conveying device 16 in that the belt of first conveying device 12 and carriage 42 are moved in conveying direction 100 at the same time and at the same speed.

Once the format arrangement of food portions 9, 10 has been arranged on second conveying device 16, the latter is conveyed onwards in conveying direction 100 and at the same time rotated until its conveying direction 101 is aligned with conveying direction 100 of the production line, which corresponds to the conveying direction of third conveying device 17. Once second conveying device 16 has been driven up to third conveying device 17 in a flush manner, the entire turned format arrangement can be driven onward onto third conveying device 17. A different robot can be provided Instead of gantry robot 41 and be arranged above the production line and relocate an entire format including the depositing belt. The robot is then respectively configured such that it can engage with and move depositing surface 14 of second conveying device 16. According to the disclosure, however, the robot is attached to a frame 45 above second conveying device 16. For example, the robot with its supporting structure is directly attached to the frame. The robot can be modular and removable when no rotation station is needed in the line pass. Furthermore, the robot and its supporting structure can have approximately the dimensions of the rotation station.

Figure 17:
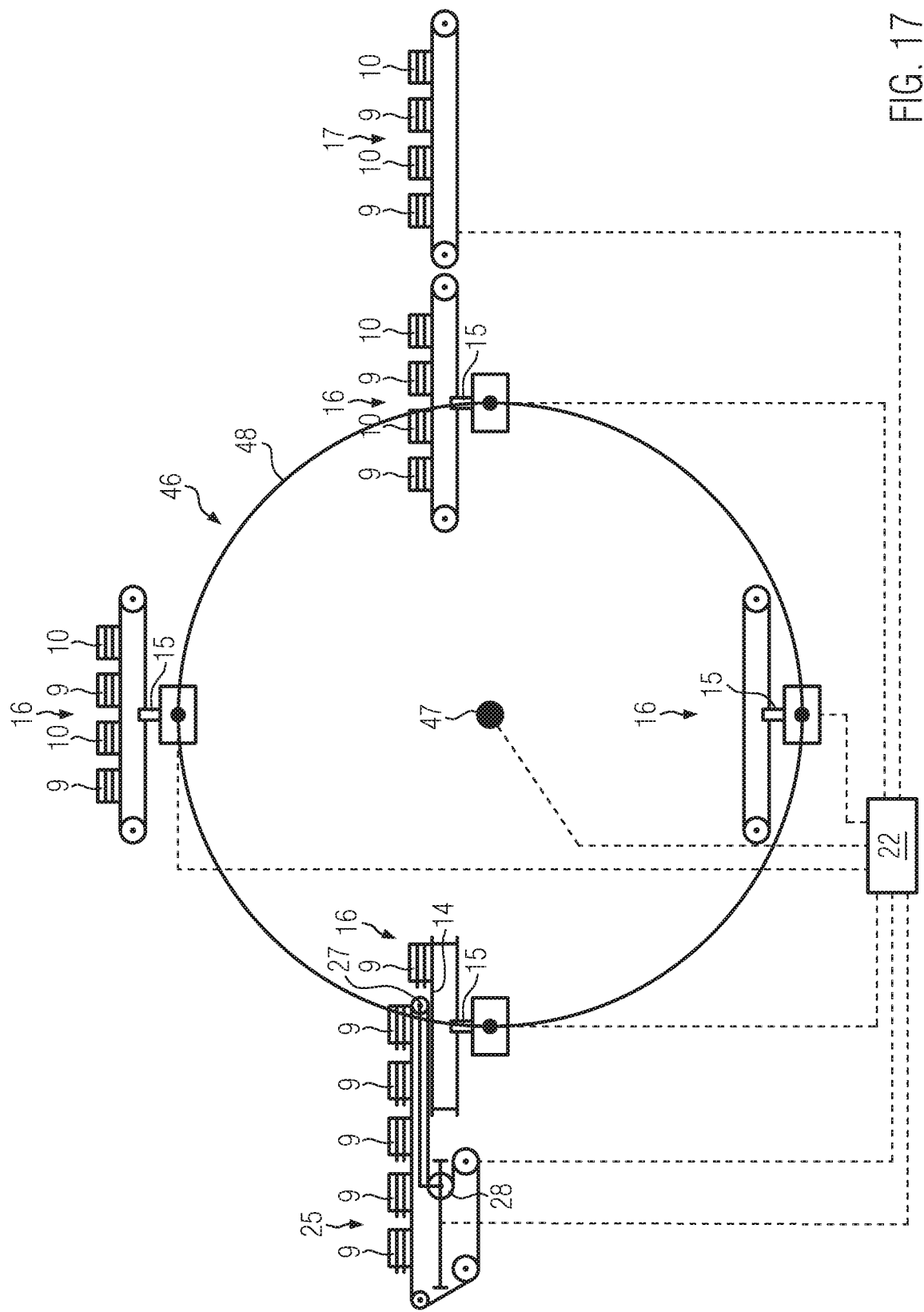
FIG. 17 shows a side view of an eighth embodiment of an apparatus according to the disclosure for handling food portions.

FIG. 17 shows an eighth embodiment of the disclosure in which rotation device 46 comprises a rotary wheel 48 rotating about a horizontal axis 47. Attached to rotary wheel 48 are several second conveying devices 16 distributed around the circumference in such a manner that they can each be turned about a vertical axis 15. By way of rotary wheel 48, a second conveying device 16 can now be arranged in the initial position at first conveying device 25 which is configured as a retraction belt.

Food portions 9, 10 are then arranged in a format arrangement on second conveying device 16. Rotary wheel 48 rotates until a subsequent second conveying device 16 without food portions 9, 10 is arranged at first conveying device 25. Food portions 9, 10 are now conveyed by conveying device 25 onto second conveying device 16. At the same time, already loaded second conveying device 16 is turned about vertical axis 15 and in the further progress arranged flush with third conveying device 17 by rotation of the rotary wheel. The turned format arrangement of food portions 9, 10 can then be conveyed onto third conveying device 17.

Rotary wheel 48 is preferably arranged only on one side of the production line and second conveying devices 16 are arranged on cantilevers arms. This allows second conveying device 16 to be easily removed to one side. Alternatively possible, however, is also a two-sided arrangement of rotary wheels which are connected to crossbars on which second conveying device 16 are arranged.

The features of the various embodiments described above can be combined as desired.

In the preceding embodiments, the rotation device advantageously comprises at least one driven conveyor belt for dispensing and/or receiving food portions 9, 10 in a format arrangement. In particular, a continuous broad conveyor belt or individually driven lanes are provided on the rotation device.

In all embodiments, the rotation device can be configured as a modular rotary cassette which comprises all the necessary drives and therefore forms a self-contained module that can be integrated into the production line as needed. The rotary cassette can therefore be exchanged for a simple cassette with a continuous conveyor belt if no rotational function is needed.

Figure 18:
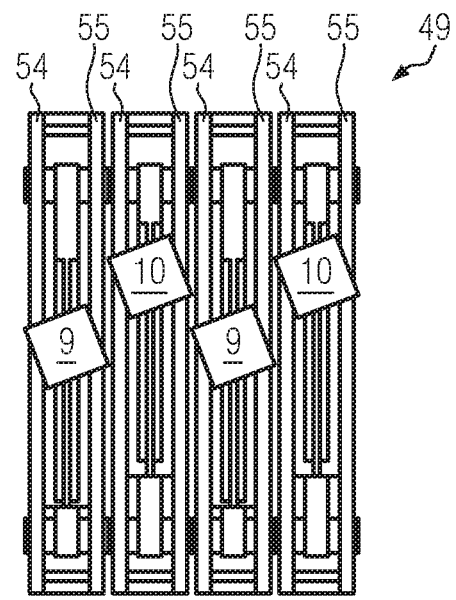
FIG. 18 shows a top view of a further embodiment of a rotation device.
Figure 19:
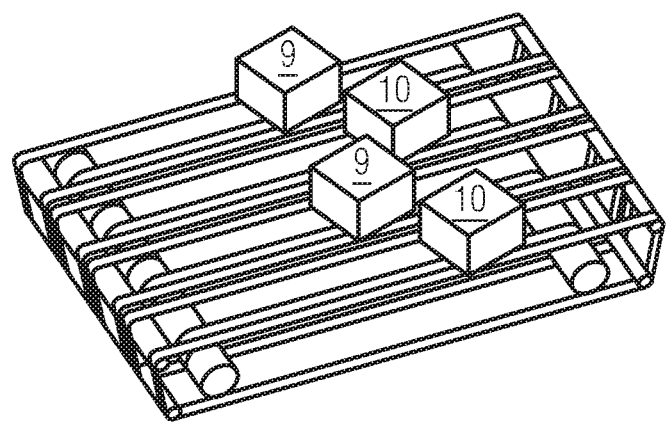
FIG. 19 shows a perspective view of the rotation device from FIG. 18.

A further embodiment of a rotation device 49 is shown in FIGS. 18 and 19. This rotation device comprises several parallel lanes 50, 51, 52, 53, each having a first and a second conveyor belt 54, 55. Conveyor belts 54, 55 are each provided with separately controllable drives, so that they can be operated at different speeds. This makes it possible to turn food portions 9, 10 which are arranged in the respective lanes. Food portions 9, 10 are preferably turned with some longitudinal offset, so that their corners do not touch during the rotation.

In a further embodiment, all food portions of a format arrangement can be rotated simultaneously at individual points on a rotation device 49. For example, each food portion is raised slightly with its respective associated turntable from the depositing surface of the second conveying device, then rotated and thereafter again placed on the depositing surface. The depositing surface can be composed of two parallel conveyor belts. The turntables are preferably coupled to each other, and in particular are guided in an associated slotted link, so that the same motion is performed by several turntables, and several food portions can be turned the same way. Coupling can be effected in particular by way of a belt drive, via a lever arrangement or via coupling rods. In this embodiment, no belt gap arises because no displacement of the rotation device in the conveying direction is necessary. The offset shown during rotation on adjacent lanes arises for the reason that the respective slotted guide for adjacent turntables is installed with some longitudinal offset.

The disclosure provides, in particular, an efficient method and an advantageous apparatus for producing combinations of two food portions which can subsequently be packaged together in a tubular bag in a tubular bag packaging machine.

The format arrangement of food portions 9, 10 can be completely rotated in the production line, where the rotation function is integrated into the production line.

The format formation and exact alignment of food portions relative to each other can be done already upstream of the rotation device, since the rotation device allows maintaining the format arrangement. Only buffering and, if necessary, a separation is therefore connected downstream of the rotation device, where any alignment or grouping does not need to take place any more.

Compared to the rotation of individual portions, it is provided according to the disclosure that always an entire format set of food portions can be rotated with a single motion, so that the rotation has no effect on the conveying cycle, where several food portions are always available on the output side in a buffered manner. Compared to the rotation of single portions, the rotation of entire format arrangements can be implemented with a lower cycle at the same throughput.

What is claimed is:

1. A method for producing packaged food portions by way of a production line, the method comprising:
   slicing a food product to produce food portions;
   conveying the food portions along a conveying direction of the production line;
   arranging the food portions in a format arrangement;
   rotating the food portions arranged in the format arrangement using a rotation device that is integrated into the production line; and
   packaging the food portions;
   wherein slicing a food product to produce food portions comprises slicing a plurality of food products to produce food portions arranged in a plurality of lanes, and wherein at least two respective food portions from different lanes of the plurality of lanes are arranged in a single lane due to their rotation and then packaged together.

2. The method according to claim 1, wherein arranging the food portions in the format arrangement comprises aligning the food portions relative to each other in a predetermined relative arrangement, this relative arrangement being maintained during rotation.

3. The method according to claim 1, further comprising depositing the food portions arranged in the format arrangement onto a conveying device of the rotation device, wherein the conveying device has a conveying direction that is at an angle relative to the conveying direction of the production line while the food portions arranged in the format arrangement are deposited onto the conveying device, wherein the conveying device of the rotation device is then oriented such that the conveying direction of the conveying device points in the conveying direction of the production line, and wherein the food portions are then conveyed away from the rotation device.

4. The method according to claim 1, wherein the food portions arranged in the format arrangement are conveyed onto the rotation device by way of a retraction belt, wherein a movable retraction roller of the retraction belt is moved at a relative speed in a conveying direction of the retraction belt to above the rotation device, and wherein the retraction belt is operated at a conveying speed which is adapted to the relative speed.

5. The method according to claim 1, wherein the rotation device is adjusted in height before, during, and/or after the rotation to enable rotating and/or conveying the food portions arranged in the format arrangement.

6. The method according to claim 1, wherein the rotation device is movable in the conveying direction of the production line before, during, and/or after the rotation to enable rotating and/or conveying the food portions arranged in the format arrangement.

7. The method according to claim 1, wherein the rotation device is moved only within the production line.

8. The method according to claim 1, wherein at least two respective food portions are grouped after slicing, and the grouped food portions are arranged in the format arrangement.

9. The method according to claim 1, wherein the food portions arranged in the format arrangement are rotated by the rotation device by 90°.

10. The method according to claim 1, wherein the plurality of food products include at least two different kinds of food products.

11. A method for producing packaged food portions by way of a production line, the method comprising:

slicing a food product to produce food portions;

conveying the food portions along a conveying direction of the production line;

arranging the food portions in a format arrangement;

depositing the food portions arranged in the format arrangement onto a conveying device of a rotation device that is integrated into the production line, wherein the conveying device has a conveying direction that is at an angle relative to the conveying direction of the production line while the food portions arranged in the format arrangement are deposited onto the conveying device;

rotating the food portions arranged in the format arrangement using the rotation device such that the conveying direction of the conveying device points in the conveying direction of the production line;

conveying the food portions away from the rotation device; and packaging the food portions.

* * * * *